UNITED STATES PATENT OFFICE 2,661,197

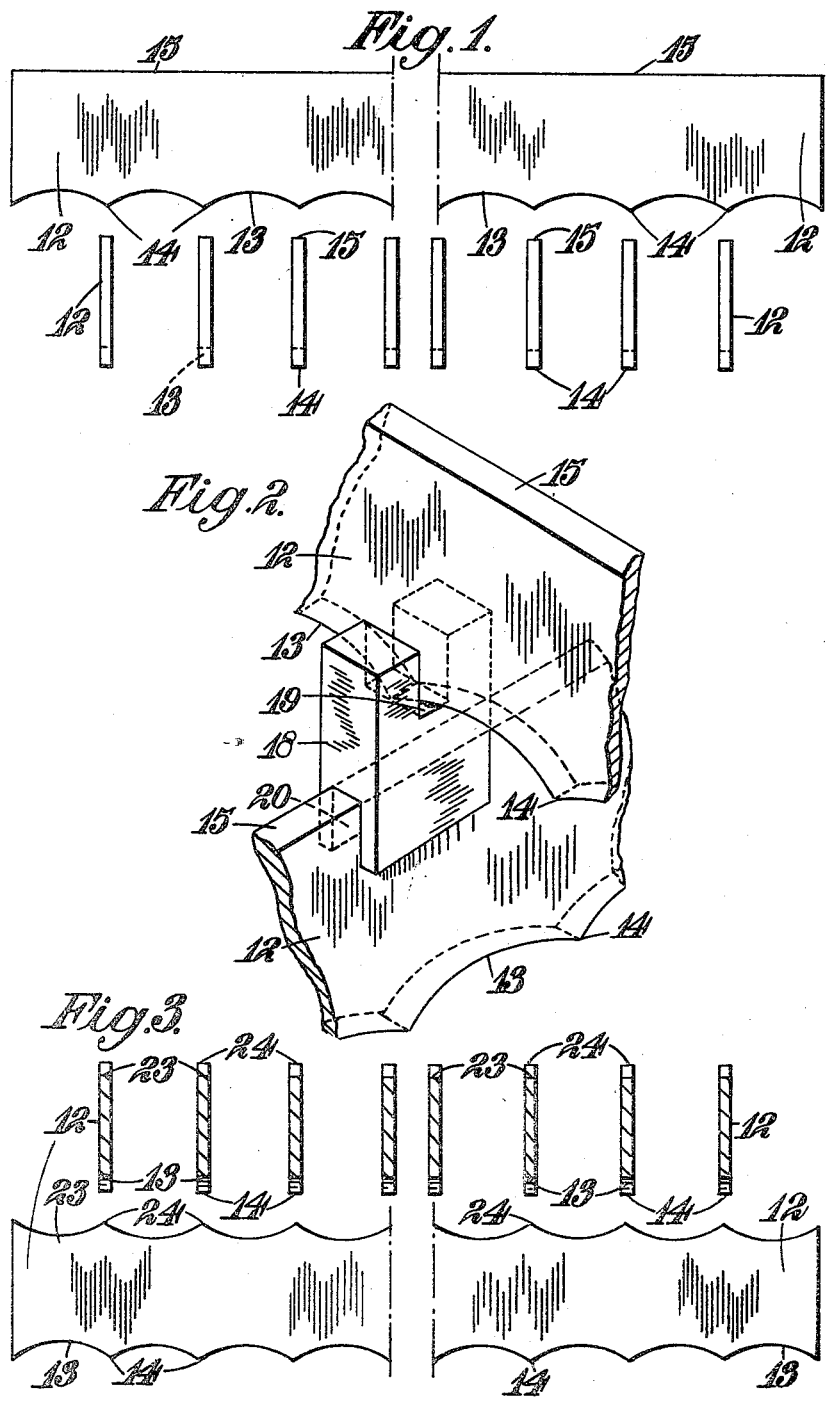

APPARATUS FOR TREATING GASES WITH LIQUIDS

William Stephens Norman, Chester, England, assignor to C. D. Patents Limited, London, England, a British company Application October 10, 1949, Serial No. 120,479

Claims priority, application Great Britain July 6, 1949

4 Claims. (Cl. 261—112)

This invention relates to improvements in apparatus for treating gases or vapours with liquids as in scrubbing towers, distillation or cooling towers and the like. In packing elements used for scrubbing towers it has been found advantageous to use a vertical series of grids consisting of metal, stoneware, carbon, wood or other suitable chemical-resisting material and to form this material into upright strips or slats which are then arranged in grids and it is usual to arrange successive grids in the tower alternately at rightangles to each other in a vertical series. The main problem in securing the best results from the use of such packing elements is to ensure that the whole of the grid system is wetted uniformly and it is a further desideratum to effect this uniform wetting with a minimum amount of liquid flowing downwards through the tower. It has previously been found advantageous in such grid systems to arrange for the lower edge of each grid to have serrations (or projecting points) in order to ensure that the liquid flows off one grid in a controlled manner but in that previous arrangement the lower edge of each grid was definitely in contact with the next lower grid.

According to this invention, in apparatus for treating gases or vapours with liquid (i. e. with liquid films flowing over the solid surfaces of grids) the grids are spaced apart by a short distance such as ¼ inch so that the dripping liquid from the botom edge of a grid falls freely under gravity and strikes the upper edge of the grid underneath with sufficient velocity or energy to cause an outward ripple to be formed in the film on the upper edge of the lower grid.

This invention therefore consists of apparatus for treating gases or vapours with liquids consisting of a tower containing a vertical series of horizontal grids each grid made up of spaced parallel upright slats having transverse grooves at the lower edges providing spaced, downwardly projecting points vertically spaced by a short distance from the upper edges of the next lower grid so that liquid films descending on the surfaces of said slats form liquid drops at said downwardly projecting points which drops fall freely on to the edge of the slat below to cause to ripple to be formed in the liquid film on the upper edge of the lower slat.

The effect of the dripping action and of the ripple is to spread the film on the vertical surfaces of the lower grid over a much wider area than in the case when the two grids are allowed to touch, and the general effect is to improve the efficiency of the tower, particularly when the flow of liquid is at a minimum.

The bottom edge of each slat or grid element is preferably serrated in such a way that the liquid is caused to drip from a series of points, these points being located immediately above the grids or slats in the next lower layer (which are at right angles to the slats of the upper grid) and separated therefrom by a distance of about ¼ inch. The serrations may be formed by notches cut in the lower edge of the slats, and such notches may be in the form of triangles, arcs or other suitable shapes.

The top edges of the grids may be flat or they may have shallow serrations or arcs lying in the plane of the grid to assist the lateral flow of liquid away from the crests or points at which the liquid drops strike the grids.

It has been found that the improved distribution conferred by the dripping action is most effective when the depth of the grids or slats in each layer or packing unit does not exceed about 1 inch.

Grid packings of straight slats formed according to this invention may be installed in a tower in the customary arrangement with the grids in each layer at right angles to those immediately above and below, and the slats in every second layer lying in the same vertical planes. In some cases it may be advantageous to stagger the grids so that the slats in every fourth layer lie in the same vertical planes.

The nature of this invention and the manner in which it is performed will be appreciated from the following description of two examples, reference being made to the accompanying drawings in which:

Figure 1 is a front view of two grids whose upright slats run in a direction at right angles to one another.

Figure 2 is a perspective view on a larger scale showing the manner in which distance pieces keep adjacent grids apart.

Figure 3 is a view similar to Figure 1 showing an alternative arrangement.

Figure 4:
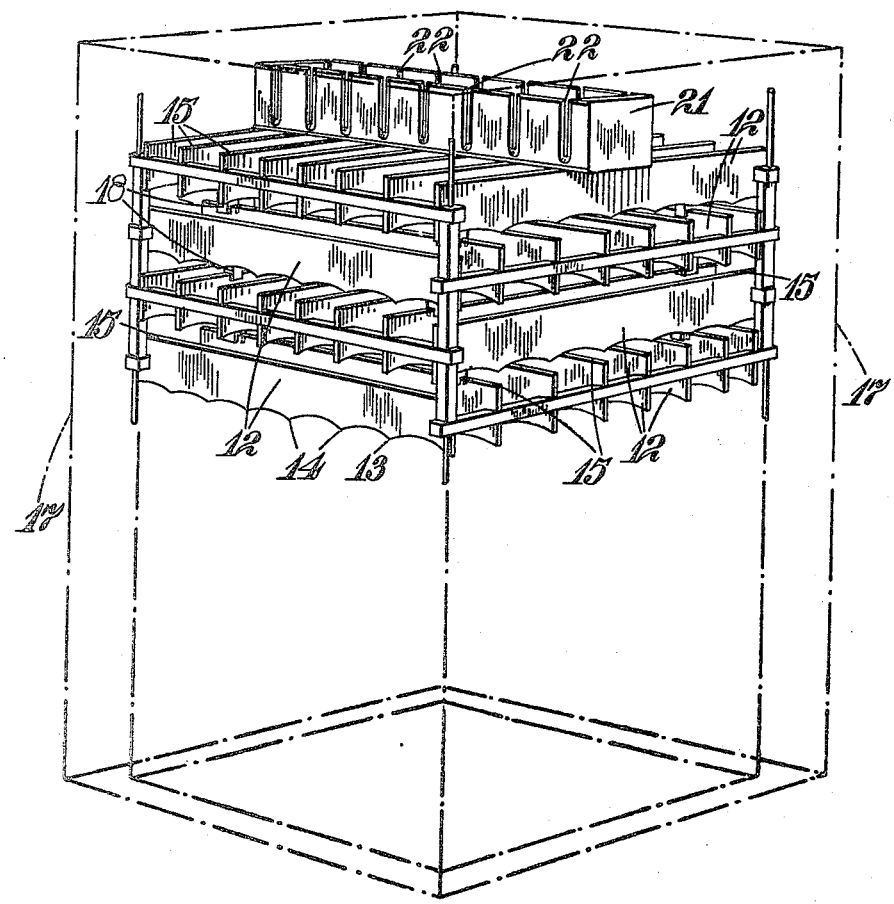
Figure 4 is a perspective view of the general assembly broken away.

Referring first to Figures 1 and 4 each grid is made up of parallel upright slats 12. The bottom edge of each slat has arcuate grooves 13 providing spaced, downwardly projecting points 14. The slats 12 of the next lower grid lie in a direction at right angles to those of the first mentioned grid and in the arrangement shown in Figures 1 and 4 the top edges of the lower grid are flat as indicated at 15. The distance from a downwardly projecting point 14 of one slat to the top edge of the slat immediately beneath is about ¼ inch.

It will be appreciated from Figure 4 that the vertical series of horizontal grids is enclosed in a tower 17, the height of which is chosen to suit particular industrial operations. To distribute the liquid on to the topmost grid use is made of troughs 21 to which the liquid is supplied and these troughs are slotted as at 22 to allow the liquid to flow on to the tops of the slats of the topmost grid.

Figure 2 shows in perspective the form of a distance piece 18 with a slot 19 to receive a slat of an upper grid and a slot 20 to receive a slat of a lower grid. Very few of these distance pieces are required indeed only sufficient to ensure the correct spacing between adjacent grids.

In the arrangement shown in Figure 3, the slats 12 have the bottom edges formed with arcuate grooves 13 and liquid-collecting points 14 as before, but in this case the upper edge of each slat has spaced arcuate grooves 23 forming crests or upwardly directed points 24 to receive the drops falling from the points of the next higher slat.

I claim:
1. Apparatus for treating gases or vapours with liquids consisting of a tower containing a vertical series of horizontal grids, each grid made up of spaced parallel upright slats, the slats being serrated at their lower edges to provide spaced, downwardly projecting points, the direction of the slats of one grid being at right angles to the direction of the slats of the next grids, and each downwardly projecting point being arranged above a slat in the grid next below, means vertically spacing said slats and said points being spaced vertically above the upper edges of the slats of the next lower grid by a distance of one-eighth to three-eighths inch, so that liquid films descending on the surfaces of said slats form liquid drops at said downwardly projecting points which drops fall without disintegrating on to the edge of the slat below to cause a ripple to be formed in the liquid film on the upper edge of the lower slat without splashing or formation of fine liquid droplets.

2. Apparatus for treating gases or vapours as claimed in claim 1 wherein the serrations are formed by the intersection of transverse arcuate recesses in the edge of the slat.

3. Apparatus for treating gases or vapours as claimed in claim 1 wherein the distance of each downwardly directed point from the nearest part of the upper edge of the next lower slat is about a quarter of an inch, and the vertical dimension of the grid is about one inch.

4. Apparatus for treating gases or vapours as claimed in claim 1 wherein the upper edges of the slats are serrated to provide spaced upwardly projecting points each of which lies vertically beneath a downwardly directed point of a slat above.

WILLIAM STEPHENS NORMAN.

References Cited in the file of this patent

UNITED STATES PATENTS

| Number | Name | Date |
| --- | --- | --- |
| 1,027,184 | Coffey | May 21, 1912 |
| 1,486,032 | Pourcel | Mar. 4, 1924 |
| 1,785,572 | Anderson et al. | Dec. 16, 1930 |
| 2,562,827 | Simpson | July 31, 1951 |

FOREIGN PATENTS

| Number | Country | Date |
| --- | --- | --- |
| 496,051 | Great Britain | Nov. 21, 1938 |